(12) United States Patent
Rajapaksa et al.

(10) Patent No.: US 10,097,948 B2
(45) Date of Patent: Oct. 9, 2018

(54) POINT-AND-CONNECT BLUETOOTH PAIRING

(71) Applicant: Intel Corporation, Santa Clara, CA (US)

(72) Inventors: Indrajith Rajapaksa, Hillsboro, OR (US); Suraj Sindia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/086,910

(22) Filed: Mar. 31, 2016

(65) Prior Publication Data

US 2017/0289735 A1    Oct. 5, 2017

(51) Int. Cl.
*H04W 4/00*  (2018.01)
*H04W 12/04*  (2009.01)
(Continued)

(52) U.S. Cl.
CPC ............. *H04W 4/008* (2013.01); *H04W 4/80* (2018.02); *H04W 12/04* (2013.01); *H04W 76/10* (2018.02)

(58) Field of Classification Search
CPC .................................................. H04W 4/008
(Continued)

(56) References Cited

U.S. PATENT DOCUMENTS 8,126,157 B2 * 2/2012 Buil ........................ G06F 21/10
380/270

8,249,504 B2 * 8/2012 Fujii ........................ H04L 63/08
455/41.2
(Continued)

FOREIGN PATENT DOCUMENTS

CN      103067055 A     4/2013
CN      103997570 A     8/2014
(Continued)

OTHER PUBLICATIONS

"I want to know more about IR Blaster", Samsung, [Online], Retrieved from the Internet: URL: http://www.samsung.com/au/support/skp/faq/1039616>, (Updated: Jul. 14, 2015).
(Continued)

*Primary Examiner* — Wen Huang
(74) *Attorney, Agent, or Firm* — Schwegman Lundberg & Woessner, P.A.

(57) ABSTRACT

Various systems and methods for initiating a communication session are provided herein. A system includes a transceiver disposed in a housing of the system; a controller coupled to the transceiver; a communication controller to interface with the controller and cause the transceiver to: transmit a first signal to a receiver device, the first signal including a public key associated with the system; receive a response from the receiver device, the response including an encrypted public key of the receiver device, the public key of the receiver device encrypted with the public key associated with the system; and transmit a second signal to the receiver device, the second signal including an encrypted unique identifier, the unique identifier associated with the system and used to establish a Bluetooth connection between the system and the receiver device, and the unique identifier encrypted with the public key of the receiver device.

25 Claims, 5 Drawing Sheets

(51) Int. Cl.
*H04W 4/80* (2018.01)
*H04W 76/10* (2018.01)

(58) Field of Classification Search
USPC ...................... 455/41.1, 41.2, 41.3
See application file for complete search history.

(56) References Cited

U.S. PATENT DOCUMENTS

| | | | |
|---|---|---|---|
| 8,254,838 B2 | 8/2012 | Feldstein | |
| 2004/0165726 A1 | 8/2004 | Yamamichi et al. | |
| 2006/0135065 A1* | 6/2006 | Lee ..................... | H04W 12/04 |
| | | | 455/41.1 |
| 2007/0032195 A1 | 2/2007 | Kurisko et al. | |
| 2007/0171848 A1* | 7/2007 | Fujii .................... | H04L 63/061 |
| | | | 370/310 |
| 2009/0006846 A1 | 1/2009 | Rosenblatt | |
| 2010/0021176 A1* | 1/2010 | Holcombe ......... | H04B 10/1143 |
| | | | 398/115 |
| 2011/0021151 A1* | 1/2011 | Takekawa .......... | H04M 1/7253 |
| | | | 455/41.2 |
| 2011/0070837 A1* | 3/2011 | Griffin ................ | H04B 5/0062 |
| | | | 455/41.3 |
| 2011/0237193 A1* | 9/2011 | Shen ................... | G06F 1/1694 |
| | | | 455/41.2 |
| 2011/0314425 A1 | 12/2011 | Chiang | |
| 2013/0171981 A1 | 7/2013 | Woo | |
| 2013/0332739 A1 | 12/2013 | Yi et al. | |
| 2014/0273844 A1* | 9/2014 | Castillo .............. | H04B 7/2612 |
| | | | 455/41.2 |
| 2014/0313363 A1 | 10/2014 | Chiu et al. | |
| 2015/0078753 A1 | 3/2015 | Lung et al. | |
| 2015/0121470 A1 | 4/2015 | Rongo et al. | |
| 2015/0185850 A1 | 7/2015 | Guilak et al. | |
| 2015/0186006 A1 | 7/2015 | Song et al. | |
| 2015/0248388 A1 | 9/2015 | Chen et al. | |
| 2015/0264724 A1* | 9/2015 | Yao ..................... | H04W 76/02 |
| | | | 705/39 |
| 2017/0006004 A1* | 1/2017 | Li ........................ | H04L 63/061 |
| 2017/0290077 A1 | 10/2017 | Nilsson et al. | |

FOREIGN PATENT DOCUMENTS

| | | |
|---|---|---|
| CN | 104735607 A | 6/2015 |
| EP | 2835002 | 2/2015 |
| KR | 101076533 B1 | 10/2011 |
| WO | 2015199777 | 12/2015 |
| WO | 2017172106 | 10/2017 |
| WO | 2017172107 | 10/2017 |

OTHER PUBLICATIONS

"Keysight U1177A IR-to-Bluetooth® Adapter", Data Sheet, Keysight Technologies, (Aug. 3, 2014), 6 gs.

"International Application Serial No. PCT US2017 018564, Written Opinion dated May 24, 2017", 6 pgs.

"International Application Serial No. PCT US2017 018564, International Search Report dated May 24, 2017", 3 pgs.

"International Application Serial No. PCT US2017 018562, Written Opinion dated May 24, 2017", 7 pgs.

"International Application Serial No. PCT US2017 018562, International Search Report dated May 24, 2017", 3 pgs.

"International Application Serial No. PCT US2017 062790, International Search Report dated Mar. 19, 2018", 3 pgs.

"International Application Serial No. PCT US2017 062790, Written Opinion dated Mar. 19, 2018", 9 pgs.

\* cited by examiner

POINT-AND-CONNECT BLUETOOTH PAIRING

TECHNICAL FIELD

Embodiments described herein generally relate to networking and in particular, to initiating a communication session.

BACKGROUND

According to some technical analysts, there will be over 50 billion connected "things" by the year 2020. This will completely transform current infrastructures and will drive new innovations in industry, products, and services. Internet of Things (IoT) is term that represents devices and systems that communicate over a network, such as the Internet. The IoT is a network of physical objects or "things" embedded with electronics, software, and sensors that enables these objects to collect and exchange data between themselves and between other computing devices. Example "things" include connected home appliances, sensors in automobiles, biochips, public cameras, wearable devices, and the like. Standards groups have begun the process of formulating standards that specify procedures for device discovery, communications between devices, service discovery, security, and other procedures used in forming and maintaining IoT networks. Example groups include the Open Interconnect Consortium (OIC), Internet Protocol for Smart Objects (IPSO) Alliance, and the Industrial Internet Consortium.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
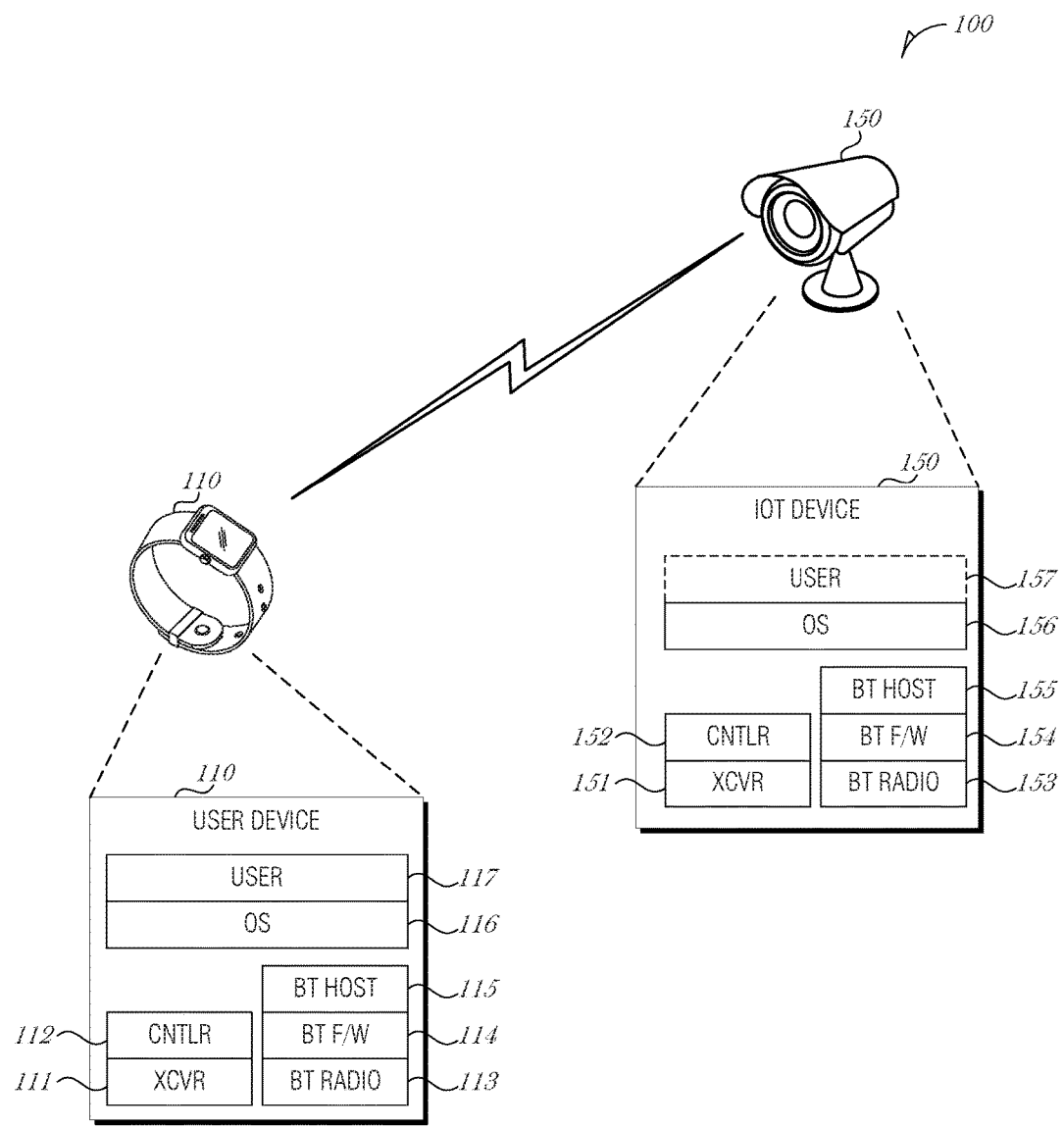
FIG. 1 is a schematic diagram illustrating an operating environment, according to an embodiment.

In the following description, for purposes of explanation, numerous specific details are set forth in order to provide a thorough understanding of some example embodiments. It will be evident, however, to one skilled in the art that the present disclosure may be practiced without these specific details.

IoT may be described as a 'network of networks' where devices utilize underlying communications networks and technologies such as the Internet to communicate, but form their own logical networks of IoT devices (called nodes). As noted above, the prevalence of IoT devices is increasing. IoT devices may contain a variety of sensors (e.g., cameras, microphones, global positioning systems (GPS), telemetry, etc.) for a variety of purposes, such as a camera and microphone on a television set to allow video conferencing. IoT devices include practically anything that is network-capable and remotely-controllable, such as windows shades, refrigerators, ceiling lights, landscaping lights, security systems, thermostats, televisions, network accessible storage (NAS), automobiles, health monitors, exercise equipment, industrial equipment, manufacturing equipment, robots, and the list goes on.

Interconnection between IoT devices may be provided using a variety of communication standards, such as ZigBee, Bluetooth, Bluetooth Low Energy (BLE), Symphony, 6LoWPAN, Wireless Fidelity (WiFi) protocols utilizing an Institute for Electrical and Electronics Engineers (IEEE) 802.11 family of standards, including 802.11n, 802.11ac, 802.11ad, 802.11ah, and the like. In the case of Bluetooth and BLE, two devices are paired using a connection protocol. Conventional Bluetooth pairing requires user involvement with software and knowledge of the Bluetooth ID of the pairing device to initiate the connection. The Bluetooth ID, which has to be transmitted to pair Bluetooth devices, poses a security risk. What is needed is a more efficient, intuitive, and secure connection and pairing system and protocol.

Disclosed herein are systems and methods that provide a simplified method to pair and connect Bluetooth devices. Using an infrared (IR) light, (or other directional beam signal), a user may initiate a Bluetooth pairing or connection protocol from a user device to bond with a target device. Use of an infrared or other direction signal as a point-and-connect protocol has several potential benefits, including ease of use, security, power savings, consistent implementation, directionality, low cost, and faster pairing and bonding time. For example, the user does not have to learn different IoT interfaces to search for IoT devices; instead, the user merely points and activates the IoT device of choice. Pairing security is enhanced due to the proximity, line-of-sight, and other characteristics of directional signal-based initiation. A user may avoid or detect a man-in-the-middle attack, for example, because the user can see the intended IoT device. Further, because the user device does not have to constantly advertise its existence, the battery drain is reduced and computational energy is conserved and secure. Other advantages will become apparent in view of the continuing discussion.

Bluetooth connection techniques differ slightly between classic Bluetooth and BLE. In classic Bluetooth, the procedure for forming connections is asymmetrical, where one Bluetooth device acts as a pager while the other Bluetooth device scans for pages. The procedure is targeted so that the page is only responded to by the specified Bluetooth device scanning for pages.

In BLE, a device that transmits advertising packets is referred to as an advertiser and devices that receive advertising packets on the advertising channels with intent to connect to an advertiser is known as an initiator. When an initiator receives an advertising packet of interest, then the initiator may request a connection over the same advertising radio frequency (RF) channel on which it received the connectable advertising packet. Devices that receive advertising on the advertising channel without the intention of connecting are referred to as scanners and are outside of the scope of this discussion. An initiator may make a request to connect to the advertiser, and once the connection is established, the initiator is referred to as the master, while the advertiser is referred to as the slave. The master controls aspects of the master-slave communication.

It is understood that while examples and embodiments are described using the BLE nomenclature, the systems and methods described herein may also be applied to Bluetooth.

FIG. 1 is a schematic diagram illustrating an operating environment 100, according to an embodiment. The operating environment 100 includes a user device 110 and an IoT device 150. The user device 110 may be any type of compute device including, but not limited to a smartphone, a laptop, a hybrid computer, a tablet, a phablet, a smartwatch, or other similar suitable devices that allow a user to initiate connection with the IoT device 150. The IoT device 150 includes, but is not limited to any type of device capable of performing a compute function and connecting over a Bluetooth or BLE connection. Examples include consumer goods (e.g., television, refrigerator, washing machine, computer printer, audio system, smartphone, fire alarm, baby monitor, home automation devices, etc.), manufacturing devices, retail devices (e.g., shopping carts, price scanners, inventory systems, etc.), public works (e.g., gas meters, fire hydrants, street lights, etc.), and other suitable devices.

The user device 110 includes a transceiver 111, capable of both sending and receiving data, and controlled by controller 112. In particular, the user device 110 may emit an IR signal with information to initiate a Bluetooth connection. Alternatively, the user device 110 may emit a millimeter wave signal to initiate a Bluetooth connection. Other directional signals may be used in place of IR or millimeter wave, such as directional sound, other wavelengths of visual light and ultraviolet light. The directional signaling may be performed using any wavelength from the radio wave spectrum down to an including the x-ray region.

Similarly, the IoT device 150 includes a transceiver 151 and controller 152, and upon receiving a triggering signal from the user device 110, the IoT device 150 may connect with the user device 110 over Bluetooth according to the IEEE 802.15 family of standards. Alternatively, instead of using a combined transceiver, the user device 110 or IoT device 150 may include separate emitter and receiver units that are each controlled by respective controllers 112, 152.

Both the user device 110 and IoT device 150 also include Bluetooth hardware, firmware, and software to enable Bluetooth connectivity. The user device 110 includes a Bluetooth radio 113 controlled by Bluetooth firmware 114 and Bluetooth host 115. Similarly, the IoT device 150 includes a Bluetooth radio 153 controlled by Bluetooth firmware 154 and Bluetooth host 155. Operating systems 116, 156 interface with the respective controllers 112, 152, and Bluetooth hosts 115, 155. Examples operating systems 116, 156 include desktop operating systems, embedded operating systems, real-time operating systems, proprietary operating systems, network operating systems, and the like. Examples include, but are not limited to Windows® NT (and its variants), Windows® Mobile, Windows® Embedded, UNIX, Android™, JavaOS, Symbian OS, Linux, and other suitable operating system platforms.

A communication controller (not shown) may be implemented in hardware, firmware, or in the operating system 116, 156 of the respective device. The communication controller may act as an interface with various hardware abstraction layer (HAL) interfaces, such as device drivers, communication protocol stacks, libraries, and the like. The communication controller is operable to receive user input (e.g., from a system event or by an express system call to the communication controller), and interact with one or more lower-level communication devices (e.g., Bluetooth radio, cellular radio, infrared emitter, millimeter wave transceiver, etc.) based on the user input. The communication controller may be implemented, at least in part, in a user-level application that makes calls to one or more libraries, device interfaces, or the like, to cause communication devices to operate in a certain manner.

A user application space 117, 157 on the user device 110 and optionally on the IoT device 150, are used to implement user-level applications, controls, user interfaces, and the like, for a user to control the respective device. An application, app, extension, control panel, or other user-level executable software program may be used to initiate the signal to then, in turn, initiate Bluetooth connection protocols.

It is understood that other peer-to-peer protocols may be used instead of Bluetooth or BLE, such as WiFi Direct or ZigBee. In such configurations, alternatively configured radios may be used along with the appropriate pairing or connection protocols.

Figure 2:
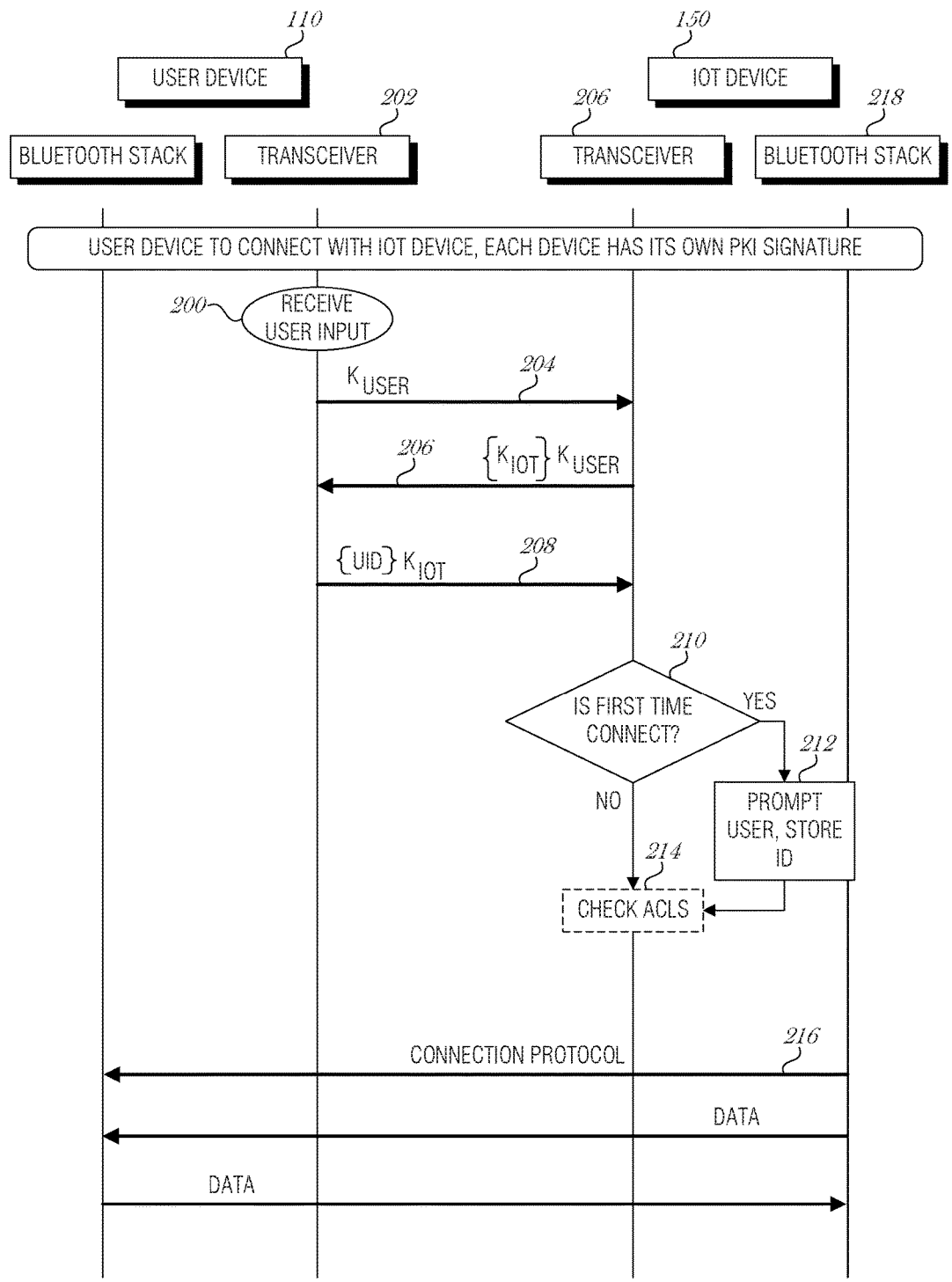
FIG. 2 is a swim lane diagram illustrating message traffic between the user device and the IoT device, according to an embodiment.

FIG. 2 is a swim lane diagram illustrating message traffic between the user device 110 and the IoT device 150, according to an embodiment. Prior to connection, each device is provisioned with a device-specific security key. The security key may be a digital signature provided by a certificate authority. The digital signature may include a public key and a private key, such as in a private-key infrastructure (PKI) mechanism. The PKI mechanism may be based on a Diffie-Hellman scheme, RSA algorithm, Lamport signatures, Merkle signatures, hash trees, Rabin signatures, or other suitable PKI schemes.

At 200, user input is received. The user input indicates that the user seeks to connect the user device 110 with the IoT device 150 using a Bluetooth (or BLE) connection. Various forms of user input may be received including, but not limited to a pressing a hard button, actuating a soft user interface control, performing a gesture, speaking a command, or other suitable user input.

Upon receiving the input, the user device 110 emits a signal using a transceiver 202 in the user device 110. The signal 204 includes the public key of the user device 110 ($K_{USER}$) and is transmitted by line-of-sight to the IoT device 150. The signal may be one of several different types of directional signals including, but not limited to IR and millimeter wave.

The IoT device 150 receives the signal 204 at a transceiver 206. In response to the signal 204, the IoT device 150 responds with a responsive signal 206, which includes the security key of the IoT device 150 ($K_{IOT}$), encrypted with the security key of the user device 110 ($\{K_{IOT}\}K_{USER}$). The responsive signal may be over the same medium as the initial signal 204, e.g., the IoT device 150 may respond with an IR signal after receiving an IR signal from the user device 110.

The user device 110 now has the public key of the IoT device 150 and encrypts a unique identification (UID) associated with the user device 110. The UID may be a Bluetooth Device Identifier that is provisioned under the Bluetooth specification (e.g., 48-bit Bluetooth device address obtained from the IEEE Registration Authority). Alternatively, the UID may be an arbitrary UID, provided by another authority.

Upon receiving the encrypted UID from the user device 110, the IoT device 150 is able to decrypt the UID and determine whether it recognizes the UID.

If this is the first time that the IoT device 150 has received this particular UID, then the IoT device 150 may prompt the user for verification (operation 210). For example, the IoT device 150 may display a prompt on a screen or other output presentation of the IoT device 150 and suspend until it receives user input indicating that the connection request is valid. After the user interacts with the IoT device 150 to indicate that the connection request was valid, the IoT device 150 may store the UID of the user device 110 in memory (e.g., in firmware or non-volatile storage on the IoT device 150, in a cloud storage location, or elsewhere) (operation 212).

Optionally, at this time, the IoT device 150 may refer to one or more access control list mechanisms, such as a white list, a black list, or other controls (operation 214).

At operation 216, the IoT device 150 attempts to connect with Bluetooth (or BLE) to the user device 110 using the UID provided by the user device 110. In effect, the exchange up to this point has acted as an advertising mechanism for the user device 110 to announce its presence and with the signaling, to announce its ability and interest in connecting. In response, the IoT device 150 may store and forward the UID to a Bluetooth stack 218 of the IoT device 150, which will then begin the connection protocol. For example, in BLE, the Bluetooth stack 218 may issue a "create connection" command to create a link layer connection to a connectable advertiser (i.e., the user device 110). After connection is established, the user device 110 and IoT device 150 may exchange data and perform other conventional Bluetooth operations.

The IoT device 150 may optionally provide an indication of successful pairing or connection. The indication may be a visual, audible, or haptic signal. For example, the IoT device 150 may have a light-emitting diode (LED) that blinks green on successful pairing, yellow for a warning condition, and red for when the pairing or connection was unsuccessful. With audible chimes, a user may be alerted of various states, such as by using a light ding for successful pairing or connection, or a low gong for a failed pairing or connection. Haptic alerts may be used as well, such as with patterns of vibrations to indicate various states. Combinations of notification mechanisms may be used together.

If the user device 110 and IoT device 150 have never been bonded before, then the user device 110 and IoT device 150 may perform an initial pairing protocol. In an example, after causing the signal to be sent from the user device 110 to the IoT device 150, the user may have to interact with the IoT device 150 in order to initially pair the devices. For example, the user may be requested to enter a secure key at the IoT device 150, via a cloud mechanism or manually, or actuate a "pair accept" button on the IoT device 150. After the initial pairing protocol is completed the first time, the devices maintain each other's information so that subsequent Bluetooth bonding may be performed without the user interaction step.

Figure 3:
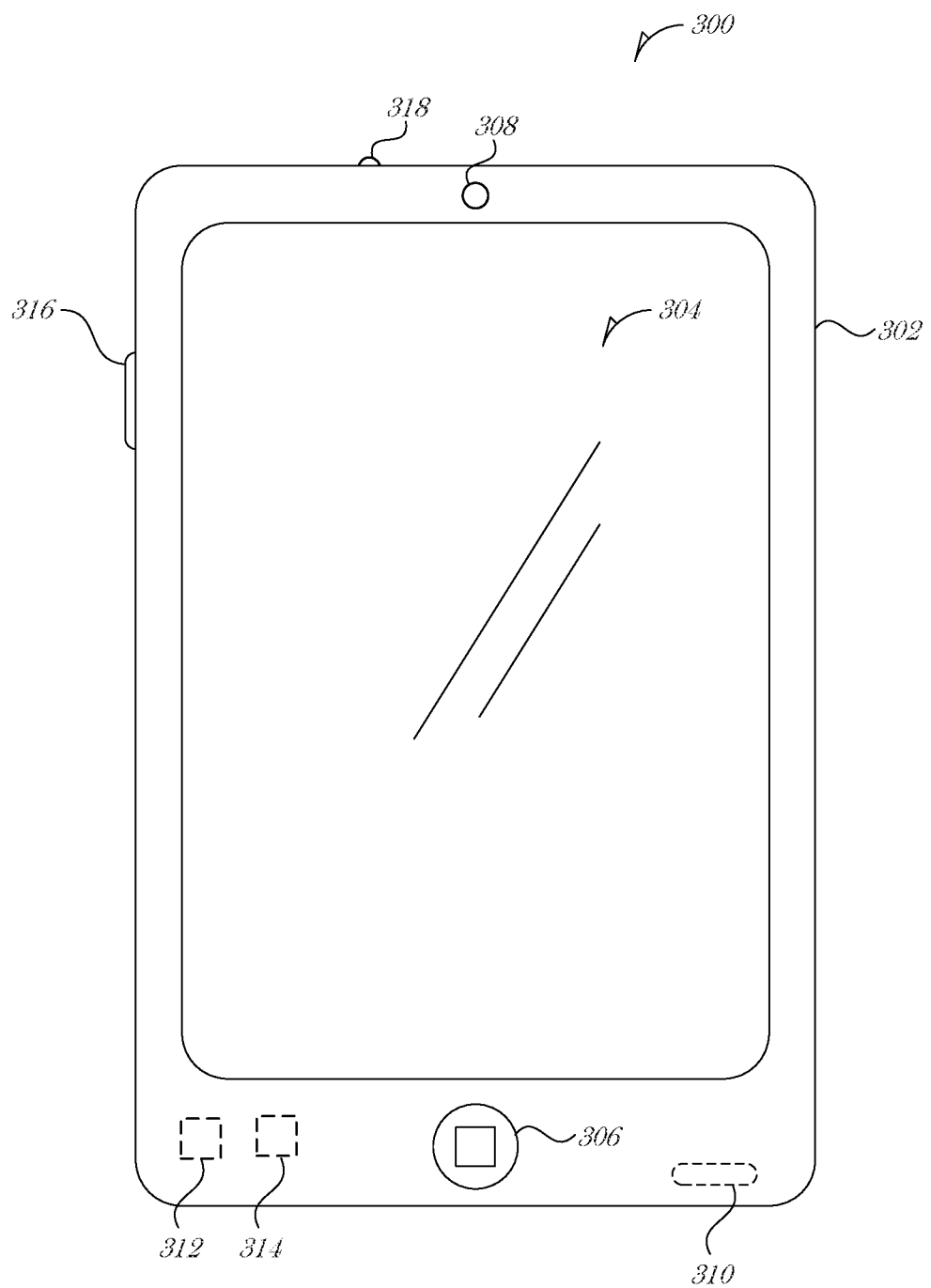
FIG. 3 is a block diagram illustrating a user device 300, according to an embodiment.

FIG. 3 is a block diagram illustrating a user device 300, according to an embodiment. The user device 300 is illustrated as a smartphone in this example, through it will be understood that user device 300 is representative of other types of computing devices, which may have more or fewer component, devices, or other features than exemplary user device 300. User device 300 has a housing 302 that encloses the interior components. The housing 302 may provide access to the interior of device 300 to some degree. For instance, in devices with a user-replaceable battery, flash memory card, or subscriber identity module (SIM) card, the housing 302 may include a user-removable cover. In devices having a design that does not facilitate user access to the interior, housing 302 may nonetheless have a provision for permitting access to technicians so that certain components may be repaired or replaced if needed.

User device 300 further includes a touchscreen 304, which may form a part of the overall enclosure of device 300 in cooperation with housing 302. The touchscreen 304 includes hardware that functions as an output device (e.g., an LED screen for visual display, power and controller circuitry, etc.), and an input device generally layered over the visual display and formed from a suitable touch or proximity-sensitive technology (e.g., capacitive, resistive, optical, ultrasonic, etc.), along with the corresponding detection and power circuitry. Additionally, the user device 300 includes a user input device 306, which in this example represents one or more user-operable input devices, such as button(s), keypad, keyboard, trackpad, mouse, etc.

As further depicted in FIG. 3, the user device 300 has several data capture devices, such as sensing transducers, the physical stimulation of which produces signaling that may be sampled, digitized, and stored as captured data. The camera 308 includes an image sensor, along with additional hardware for digitizing, processing, and storing portions of the image sensor output. The camera 308 also includes optics that may form a portion of the housing 302. The camera 308 may record still images, motion video, or both.

A microphone 310 includes audio capture circuitry that samples, digitizes, and stores portions of the signaling produced by the microphone 310 in response to sensed acoustic stimulus. The microphone 310 is typically activated together with the camera 308 when the user device 300 is operated to record videos.

Additional sensors in the user device 300 include an accelerometer 312 with a multi-axis sensor that produces signaling in response to changes in motion, and electronics to sample and digitize that signaling, and a magnetometer 314 with sensors and supporting circuitry that detect the direction and intensity of the ambient magnetic field, or any externally-applied magnetic fields.

The user device 300 may also include a user input control (e.g., hard button, a slider, a switch, or a soft button) to trigger the emitter and Bluetooth connection sequence. For example, the user device 300 may have a user input control 316 on the side of the housing 302, in this example a button, which when actuated by the user, causes a signal to be emitted from a transceiver 318. As discussed above, the signal emitted from the transceiver 318 may be of various types of directional signals, including but not limited to IR or millimeter wave. The user action may initiate the process flow discussed above with respect to FIGS. 1-2 and elsewhere herein.

Figure 4:
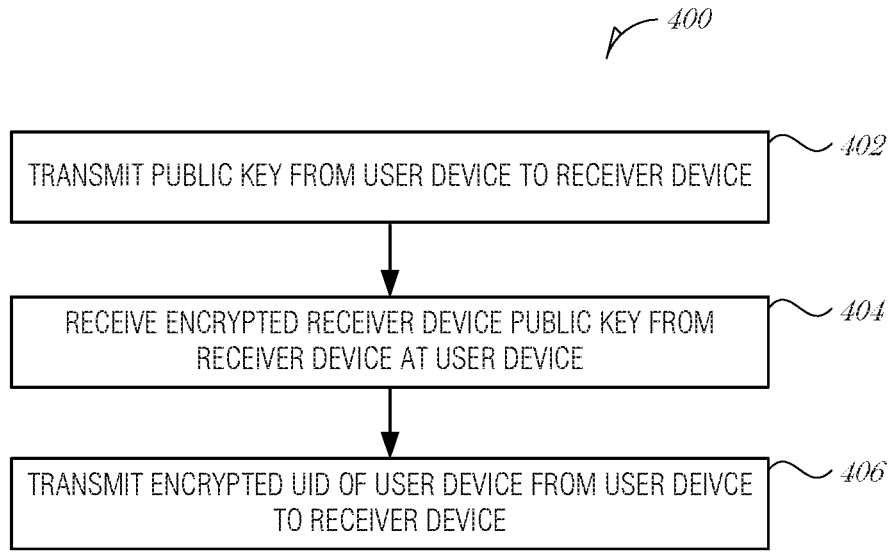
FIG. 4 is a flowchart illustrating a method for initiating a communication session from a user device, according to an embodiment.

FIG. 4 is a flowchart illustrating a method 400 for initiating a communication session from a user device, according to an embodiment. At block 402, a first signal is transmitted from the user device to a receiver device, the first signal including a public key associated with the user device. The receiver device may be an IoT device, such as that discussed above.

At block 404, a response is received from the receiver device, the response being a signal transmitted by the receiver device, the response including an encrypted public key of the receiver device, the public key of the receiver device encrypted with the public key associated with the user device.

At block 406, a second signal is transmitted from the user device to the receiver device, the second signal including an encrypted unique identifier, the unique identifier associated with the user device and used to establish a Bluetooth connection between the user device and the receiver device, and the unique identifier encrypted with the public key of the receiver device.

In an embodiment, the method 400 includes receiving a Bluetooth connection request from the receiver device and establishing a Bluetooth connection with the receiver device. In a BLE context, the connection request may be made over an advertising physical channel to a BLE radio in the user device. Once the connection request is received and accepted by the user device, the receiver device becomes the master device in what is referred to as a piconet, and the user device becomes the slave device. One or more connection events subsequently are formed and used to send data packets between the receiver device and the user device. In connection events, channel hopping occurs at the start of each event and the master and slave alternate sending data packets using the same data channel.

In an embodiment, the unique identifier is a Bluetooth device identifier of the system.

In an embodiment, the method 400 includes receiving user input from a user input control, the user input used to initiate the transmitting the first signal to the receiver device. As an example, a user may point the user device at a receiver device (e.g., IoT device) and press a button on the housing of the user device to light an infrared emitter. The infrared light and signaling may then proceed as described above. Thus, in various embodiments, the user input control comprises a hard button on an exterior portion of the housing; the user input control comprises a slider on an exterior portion of the housing; or the user input control comprises a switch on an exterior portion of the housing. In addition, the user input control may be a soft button, such as that presented on a home screen of the user device, within an application, or on a system control, for example.

Figure 5:
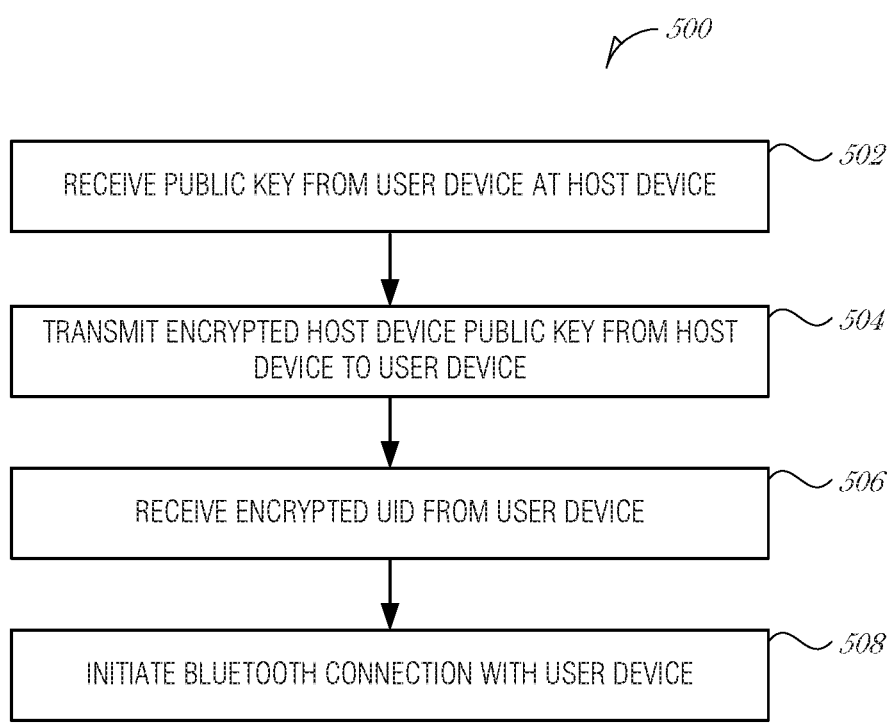
FIG. 5 is a flowchart illustrating a method for establishing a communication session with a user device, according to an embodiment.

FIG. 5 is a flowchart illustrating a method 500 for establishing a communication session with a user device, according to an embodiment. At block 502, a first signal is received, via a transceiver of a host device, from a user device, the first signal including a public key associated with the user device.

In an embodiment, the transceiver of the host device is an infrared transceiver, and the first signal and the second signals are infrared signals. In another embodiment, the transceiver of the host device is a millimeter wave transceiver, and the first signal and the second signals are millimeter wave signals.

At block 504, an encrypted public key of the host device is transmitted, via the transceiver, to the user device, the encrypted public key of the host device encrypted with the public key received from the user device.

At block 506, a second signal is received, via the transceiver, from the user device, the second signal including an encrypted unique identifier, the unique identifier associated with the user device, the unique identifier encrypted with the public key of the host device.

At block 508, a Bluetooth connection is initiated between the host device and the user device, using the unique identifier of the user device.

In an embodiment, the unique identifier is a Bluetooth device identifier of the remote device.

In an embodiment, initiating the Bluetooth connection comprises interfacing with a Bluetooth host on the host device in order to initiate a connection request with the user device. In a further embodiment, the Bluetooth host provides access control to the host device. In a further embodiment, the method 500 includes determining whether the remote device is on an access list and causing a prompt to a user for confirmation of identity, based on the determination. For example, the user may be prompted to confirm initiation of a Bluetooth connection by pressing an "ok" button, entering a code, or some other action. After interacting with the host device, the user device may be put on a whitelist (e.g., paired), so that later attempts to connect will not require the user to interact with the host device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
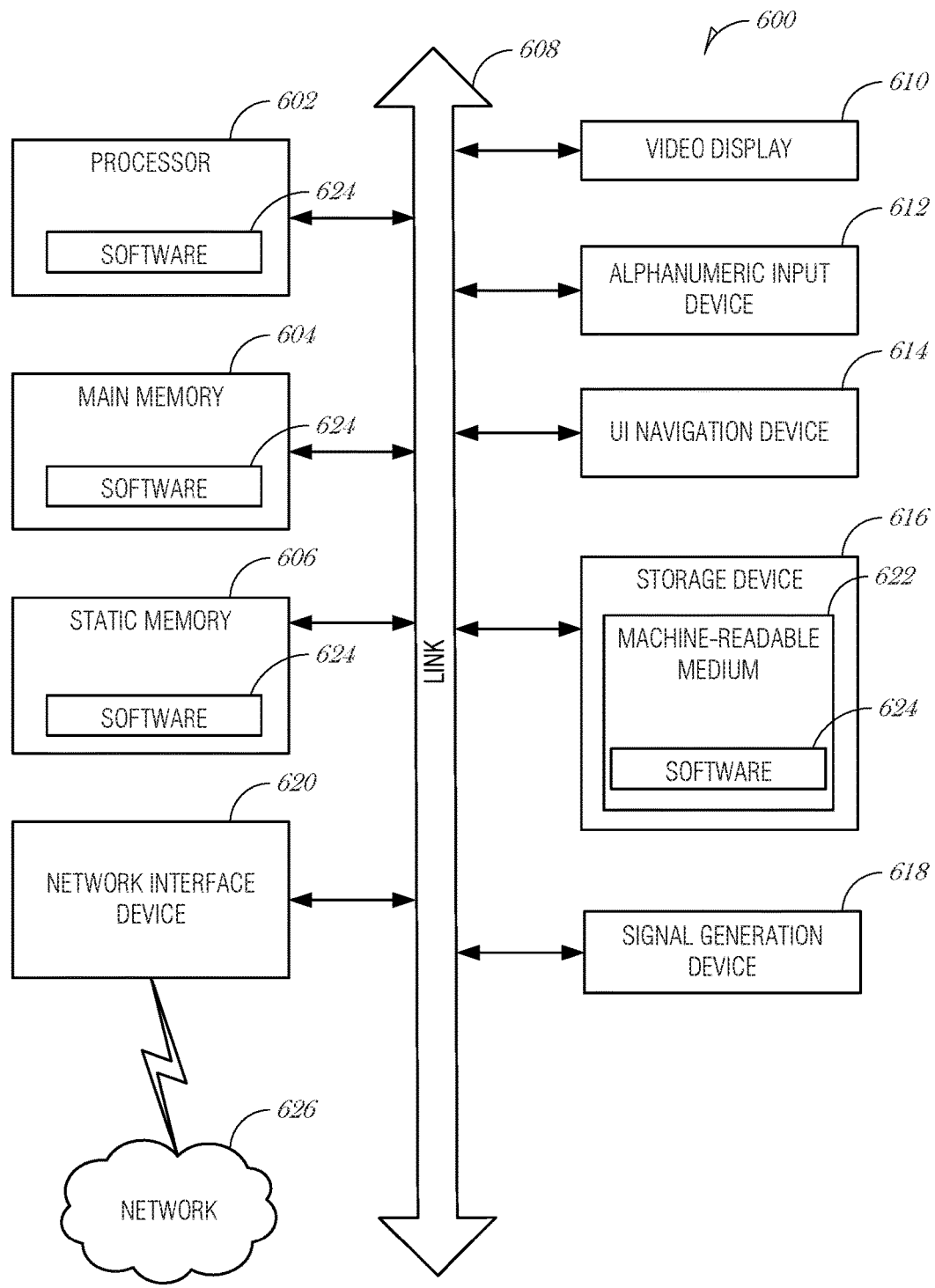
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for initiating a communication session (such as a device, apparatus, or machine) comprising: a transceiver disposed in a housing of the system; a controller coupled to the transceiver, and disposed in the housing; a communication controller to interface with the controller and cause the transceiver to: transmit a first signal to a receiver device, the first signal including a public key associated with the system; receive a response from the receiver device, the response including an encrypted public key of the receiver device, the public key of the receiver device encrypted with the public key associated with the system; and transmit a second signal to the receiver device, the second signal including an encrypted unique identifier, the unique identifier associated with the system and used to establish a Bluetooth connection between the system and the receiver device, and the unique identifier encrypted with the public key of the receiver device.

In Example 2, the subject matter of Example 1 may include, wherein the transceiver is an infrared transceiver, and wherein the first signal and the second signals are infrared signals.

In Example 3, the subject matter of any one of Examples 1 to 2 may include, wherein the transceiver is a directional millimeter wave transceiver, and wherein the first signal and the second signals are millimeter wave signals.

In Example 4, the subject matter of any one of Examples 1 to 3 may include, a Bluetooth radio coupled to the communication controller, the Bluetooth radio to interface with a Bluetooth host and firmware, and to establish the Bluetooth connection with the receiver device.

In Example 5, the subject matter of any one of Examples 1 to 4 may include, wherein the unique identifier is a Bluetooth device identifier of the system.

In Example 6, the subject matter of any one of Examples 1 to 5 may include, a user input control that is communicatively coupled to the communication controller when in operation, and configured to receive a user input and trigger the communication controller to transmit the first signal.

In Example 7, the subject matter of any one of Examples 1 to 6 may include, wherein the user input control comprises a hard button on an exterior portion of the housing.

In Example 8, the subject matter of any one of Examples 1 to 7 may include, wherein the user input control comprises a slider on an exterior portion of the housing.

In Example 9, the subject matter of any one of Examples 1 to 8 may include, wherein the user input control comprises a switch on an exterior portion of the housing.

In Example 10, the subject matter of any one of Examples 1 to 9 may include, wherein the system is a user device.

Example 11 includes subject matter for initiating a communication session from a user device (such as a method, means for performing acts, machine readable medium including instructions that when performed by a machine cause the machine to performs acts, or an apparatus to perform) comprising: transmitting, from the user device, a first signal to a receiver device, the first signal including a public key associated with the user device; receiving a response from the receiver device, the response being a signal transmitted by the receiver device, the response including an encrypted public key of the receiver device, the public key of the receiver device encrypted with the public key associated with the user device; and transmitting, from the user device, a second signal to the receiver device, the second signal including an encrypted unique identifier, the unique identifier associated with the user device and used to establish a Bluetooth connection between the user device and the receiver device, and the unique identifier encrypted with the public key of the receiver device.

In Example 12, the subject matter of Example 11 may include, wherein the first signal and the second signals are infrared signals.

In Example 13, the subject matter of any one of Examples 11 to 12 may include, wherein the first signal and the second signals are millimeter wave signals.

In Example 14, the subject matter of any one of Examples 11 to 13 may include, receiving a Bluetooth connection request from the receiver device; and establishing a Bluetooth connection with the receiver device.

In Example 15, the subject matter of any one of Examples 11 to 14 may include, wherein the unique identifier is a Bluetooth device identifier of the system.

In Example 16, the subject matter of any one of Examples 11 to 15 may include, receiving user input from a user input control, the user input used to initiate the transmitting the first signal to the receiver device.

In Example 17, the subject matter of any one of Examples 11 to 16 may include, wherein the user input control comprises a hard button on an exterior portion of the housing.

In Example 18, the subject matter of any one of Examples 11 to 17 may include, wherein the user input control comprises a slider on an exterior portion of the housing.

In Example 19, the subject matter of any one of Examples 11 to 18 may include, wherein the user input control comprises a switch on an exterior portion of the housing.

Example 20 includes at least one machine-readable medium including instructions, which when executed by a machine, cause the machine to perform operations of any of the Examples 11-19.

Example 21 includes an apparatus comprising means for performing any of the Examples 11-19.

Example 22 includes subject matter for initiating a communication session from a user device (such as a device, apparatus, or machine) comprising: means for transmitting, from the user device, a first signal to a receiver device, the first signal including a public key associated with the user device; means for receiving a response from the receiver device, the response being a signal transmitted by the receiver device, the response including an encrypted public key of the receiver device, the public key of the receiver device encrypted with the public key associated with the user device; and means for transmitting, from the user device, a second signal to the receiver device, the second signal including an encrypted unique identifier, the unique identifier associated with the user device and used to establish a Bluetooth connection between the user device and the receiver device, and the unique identifier encrypted with the public key of the receiver device.

In Example 23, the subject matter of Example 22 may include, wherein the first signal and the second signals are infrared signals.

In Example 24, the subject matter of any one of Examples 22 to 23 may include, wherein the first signal and the second signals are millimeter wave signals.

In Example 25, the subject matter of any one of Examples 22 to 24 may include, means for receiving a Bluetooth connection request from the receiver device; and means for establishing a Bluetooth connection with the receiver device.

In Example 26, the subject matter of any one of Examples 22 to 25 may include, wherein the unique identifier is a Bluetooth device identifier of the system.

In Example 27, the subject matter of any one of Examples 22 to 26 may include, means for receiving user input from a user input control, the user input used to initiate the transmitting the first signal to the receiver device.

In Example 28, the subject matter of any one of Examples 22 to 27 may include, wherein the user input control comprises a hard button on an exterior portion of the housing.

In Example 29, the subject matter of any one of Examples 22 to 28 may include, wherein the user input control comprises a slider on an exterior portion of the housing.

In Example 30, the subject matter of any one of Examples 22 to 29 may include, wherein the user input control comprises a switch on an exterior portion of the housing.

Example 31 includes subject matter for establishing a communication session (such as a device, apparatus, or machine) comprising: a transceiver disposed in a housing of the system; a controller coupled to the transceiver, and disposed in the housing; a communication controller to interface with the controller and cause the transceiver to: receive, via the transceiver, a first signal from a remote device, the first signal including a public key associated with the remote device; transmit, via the transceiver, an encrypted public key of the system to the remote device, the encrypted public key of the system encrypted with the public key received from the remote device; receive, via the transceiver, a second signal from the remote device, the second signal including an encrypted unique identifier, the unique identifier associated with the remote device, the unique identifier encrypted with the public key of the receiver device; and initiate a Bluetooth connection between the system and the remote device, using the unique identifier of the remote device.

In Example 32, the subject matter of Example 31 may include, wherein the transceiver is an infrared transceiver, and wherein the first signal and the second signals are infrared signals.

In Example 33, the subject matter of any one of Examples 31 to 32 may include, wherein the transceiver is a directional millimeter wave transceiver, and wherein the first signal and the second signals are millimeter wave signals.

In Example 34, the subject matter of any one of Examples 31 to 33 may include, wherein the unique identifier is a Bluetooth device identifier of the remote device.

In Example 35, the subject matter of any one of Examples 31 to 34 may include, wherein to initiate the Bluetooth connection, the communication controller is to interface with a Bluetooth host on the system in order to initiate a connection request with the remove device.

In Example 36, the subject matter of any one of Examples 31 to 35 may include, wherein the Bluetooth host provides access control to the system.

In Example 37, the subject matter of any one of Examples 31 to 36 may include, wherein the Bluetooth host is to: determine whether the remote device is on an access list; and cause a prompt to a user for confirmation of identity, based on the determination.

Example 38 includes subject matter for establishing a communication session with a user device (such as a method, means for performing acts, machine readable medium including instructions that when performed by a machine cause the machine to performs acts, or an apparatus to perform) comprising: receiving, via a transceiver of a host device, a first signal from a user device, the first signal including a public key associated with the user device; transmitting, via the transceiver, an encrypted public key of the host device to the user device, the encrypted public key of the host device encrypted with the public key received from the user device; receiving, via the transceiver, a second signal from the user device, the second signal including an encrypted unique identifier, the unique identifier associated with the user device, the unique identifier encrypted with the public key of the host device; and initiating a Bluetooth connection between the host device and the user device, using the unique identifier of the user device.

In Example 39, the subject matter of Example 38 may include, wherein the transceiver of the host device is an infrared transceiver, and wherein the first signal and the second signals are infrared signals.

In Example 40, the subject matter of any one of Examples 38 to 39 may include, wherein the transceiver of the host device is a millimeter wave transceiver, and wherein the first signal and the second signals are millimeter wave signals.

In Example 41, the subject matter of any one of Examples 38 to 40 may include, wherein the unique identifier is a Bluetooth device identifier of the remote device.

In Example 42, the subject matter of any one of Examples 38 to 41 may include, wherein initiating the Bluetooth connection comprises interfacing with a Bluetooth host on the host device in order to initiate a connection request with the user device.

In Example 43, the subject matter of any one of Examples 38 to 42 may include, wherein the Bluetooth host provides access control to the host device.

In Example 44, the subject matter of any one of Examples 38 to 43 may include, determining whether the remote device is on an access list; and causing a prompt to a user for confirmation of identity, based on the determination.

Example 45 includes at least one machine-readable medium including instructions, which when executed by a machine, cause the machine to perform operations of any of the Examples 38-44.

Example 46 includes an apparatus comprising means for performing any of the Examples 38-44.

Example 47 includes subject matter for establishing a communication session with a user device (such as a device, apparatus, or machine) comprising: means for receiving, via a transceiver of a host device, a first signal from a user device, the first signal including a public key associated with the user device; means for transmitting, via the transceiver, an encrypted public key of the host device to the user device, the encrypted public key of the host device encrypted with the public key received from the user device; means for receiving, via the transceiver, a second signal from the user device, the second signal including an encrypted unique identifier, the unique identifier associated with the user device, the unique identifier encrypted with the public key of the host device; and means for initiating a Bluetooth connection between the host device and the user device, using the unique identifier of the user device.

In Example 48, the subject matter of Example 47 may include, wherein the transceiver of the host device is an infrared transceiver, and wherein the first signal and the second signals are infrared signals.

In Example 49, the subject matter of any one of Examples 47 to 48 may include, wherein the transceiver of the host device is a millimeter wave transceiver, and wherein the first signal and the second signals are millimeter wave signals.

In Example 50, the subject matter of any one of Examples 47 to 49 may include, wherein the unique identifier is a Bluetooth device identifier of the remote device.

In Example 51, the subject matter of any one of Examples 47 to 50 may include, wherein the means for initiating the Bluetooth connection comprise means for interfacing with a Bluetooth host on the host device in order to initiate a connection request with the user device.

In Example 52, the subject matter of any one of Examples 47 to 51 may include, wherein the Bluetooth host provides access control to the host device.

In Example 53, the subject matter of any one of Examples 47 to 52 may include, means for determining whether the remote device is on an access list; and means for causing a prompt to a user for confirmation of identity, based on the determination.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for initiating a communication session, the system comprising:
    a transceiver disposed in a housing of the system;
    a controller coupled to the transceiver, and disposed in the housing;
    a communication controller to interface with the controller and cause the transceiver to:
        transmit a first signal to a receiver device, the first signal including a public key associated with the system;
        receive a response from the receiver device, the response including an encrypted public key of the receiver device, the public key of the receiver device encrypted with the public key associated with the system; and
        transmit a second signal to the receiver device, the second signal inch ding an encrypted unique identifier, the unique identifier associated with the system and used to establish a Bluetooth connection between the system and the receiver device, and the unique identifier encrypted with the public key of the receiver device.

2. The system of claim 1, wherein the transceiver is an infrared transceiver, and wherein the first signal and the second signals are infrared signals.

3. The system of claim 1, wherein the transceiver is a directional millimeter wave transceiver, and wherein the first signal and the second signals are millimeter wave signals.

4. The system of claim 1, wherein the unique identifier is a Bluetooth device identifier of the system.

5. The system of claim 1, further comprising a user input control that is communicatively coupled to the communication controller when in operation, and configured to receive a user input and trigger the communication controller to transmit the first signal.

6. The system of claim 5, wherein the user input control comprises a hard button on an exterior portion of the housing.

7. The system of claim 5, wherein the user input control comprises a slider on an exterior portion of the housing.

8. A method for initiating a communication session from a user device, the method comprising:
    transmitting, from the user device, a first signal to a receiver device, the first signal including a public key associated with the user device;
    receiving a response from the receiver device, the response being a signal transmitted by the receiver device, the response including an encrypted public key of the receiver device, the public key of the receiver device encrypted with the public key associated with the user device; and
    transmitting, from the user device, a second signal to the receiver device, the second signal including an encrypted unique identifier, the unique identifier associated with the user device and used to establish a Bluetooth connection between the user device and the receiver device, and the unique identifier encrypted with the public key of the receiver device.

9. The method of claim 8, wherein the first signal and the second signals are infrared signals.

10. The method of claim 8, wherein the first signal and the second signals are millimeter wave signals.

11. The method of claim 8, further comprising:
    receiving a Bluetooth connection request from the receiver device; and
    establishing a Bluetooth connection with the receiver device.

12. The method of claim 8, wherein the unique identifier is a Bluetooth device identifier of the system.

13. At least one non-transitory machine-readable medium including instructions for initiating a communication session from a user device , which when executed by a machine, cause the machine to:
    transmit, from the user device, a first signal to a receiver device, the first signal including a public key associated with the user device;
    receive a response from the receiver device, the response being a signal transmitted by the receiver device, the response including an encrypted public key of the receiver device, the public key of the receiver device encrypted with the public key associated with the user device; and
    transmit, from the user device, a second signal to the receiver device, the second signal including an encrypted unique identifier, the unique identifier associated with the user device and used to establish a Bluetooth connection between the user device and the receiver device, and the unique identifier encrypted with the public key of the receiver device.

14. The at least one non-transitory machine-readable medium claim 13, wherein the first signal and the second signals are infrared signals.

15. The at least one non-transitory machine-readable medium of claim 13, wherein the first signal and the second signals are millimeter wave signals.

16. The at least one non-transitory machine-readable medium of claim 13, further comprising instructions, which when executed by the machine, cause the machine to:
receive a Bluetooth connection request from the receiver device; and
establish a Bluetooth connection with the receiver device.

17. The at least one non-transitory machine-readable medium of claim 13, wherein the unique identifier is a Bluetooth device identifier of the system.

18. A system for establishing a communication session, the system comprising:
a transceiver disposed in a housing of the system;
a controller coupled to the transceiver, and disposed in the housing;
a communication controller to interface with the controller and cause the transceiver to:
receive, via the transceiver, a first signal from a remote device, the first signal including a public key associated with the remote device;
transmit, via the transceiver, an encrypted public key of the system to the remote device, the encrypted public key of the system encrypted with the public key received from the remote device:
receive, via the transceiver, a second signal from the remote device, the second signal including an encrypted unique identifier, the unique identifier associated with the remote device, the unique identifier encrypted with the public key of the receiver device; and
initiate a Bluetooth connection between the system and the remote device, using the unique identifier of the remote device.

19. The system of claim 18, wherein the transceiver is an infrared transceiver, and wherein the first signal and the second signals are infrared signals.

20. The system of claim 18, wherein the transceiver is a directional millimeter wave transceiver, and wherein the first signal and the second signals are millimeter wave signals.

21. The system of claim 18, wherein to initiate the Bluetooth connection, the communication controller is to interface with a Bluetooth host on the system in order to initiate a connection request with the remove device.

22. The system of claim 21, wherein the Bluetooth host provides access control to the system.

23. The system of claim 22, wherein the Bluetooth host is to:
determine whether the remote device is on an access list; and
cause a prompt to a user for confirmation of identity, based on the determination.

24. A method for establishing a communication session with a user device, the method comprising:
receiving, via a transceiver of a host device, a first signal from a user device, the first signal including a public key associated with the user device;
transmitting, via the transceiver, an encrypted public key of the host device to the user device, the encrypted public key of the host device encrypted with the public key received from the user device;
receiving, via the transceiver, a second signal from the user device, the second signal including an encrypted unique identifier, the unique identifier associated with the user device, the unique identifier encrypted with the public key of the host device; and
initiating a Bluetooth connection between the host device and the user device, using the unique identifier of the user device.

25. The method of claim 24, wherein the transceiver of the host device is an infrared transceiver, and wherein the first signal and the second signals are infrared signals.

* * * * *

UNITED STATES PATENT AND TRADEMARK OFFICE
CERTIFICATE OF CORRECTION

PATENT NO. : 10,097,948 B2
APPLICATION NO. : 15/086910
DATED : October 9, 2018
INVENTOR(S) : Rajapaksa et al.

Page 1 of 1

It is certified that error appears in the above-identified patent and that said Letters Patent is hereby corrected as shown below:

In the Claims

In Column 15, Line 62, in Claim 1, delete "inch ding" and insert --including-- therefor In Column 16, Line 50, in Claim 13, delete "device ," and insert --device,-- therefor In Column 17, Line 2, in Claim 14, after "medium", insert --of--

Signed and Sealed this
Seventh Day of April, 2020

Andrei Iancu
*Director of the United States Patent and Trademark Office*